Nov. 3, 1964 P. E. UTERHART 3,155,336
FILM SPOOL
Filed Jan. 5, 1962

INVENTOR
PHILIP E. UTERHART
BY
*Robert F. Miehle, Jr.*
*J. R. Hall*
ATTORNEYS

3,155,336
FILM SPOOL

Philip E. Uterhart, Park Ridge, Ill., assignor to Bell & Howell Company, Chicago, Ill., a corporation of Illinois
Filed Jan. 5, 1962, Ser. No. 164,576
5 Claims. (Cl. 242—71.8)

This invention relates to a spool for flexible film material. More particularly it relates to a film spool for use in motion picture cameras. Still more particularly it relates to a one-piece spool molded from artificial material.

An object of this invention is to provide an improved one-piece molded camera spool. Another object is to provide such a spool which is sturdy, is light in weight and is of simple construction. A further object is to provide such a film spool which is economical to produce and yet is efficient and reliable in use.

The novel, one-piece camera spool for holding film of this invention comprises spaced end flange members having an axial mounting aperture adapted to receive a coacting member, and a hollow, cylindrical hub extending therebetween and integrally connected therewith, said hub having at least one slot extending longitudinally the length of the hub and terminating at said flange members and being provided with at least one tooth extending into a slot for engaging a perforation of a motion picture film.

In a preferred embodiment, the spool hub has two essentially parallel, opposed slots extending longitudinally the length of the hub and terminating at the flange members, the hub being provided with a pair of laterally spaced teeth extending into at least one of said slots.

Figure 1:
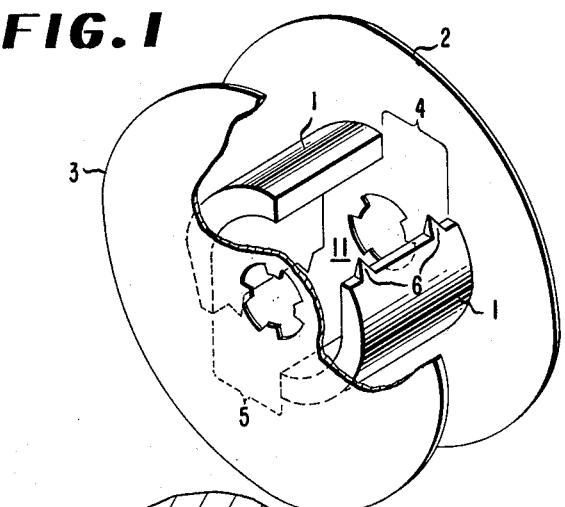
Figure 2:
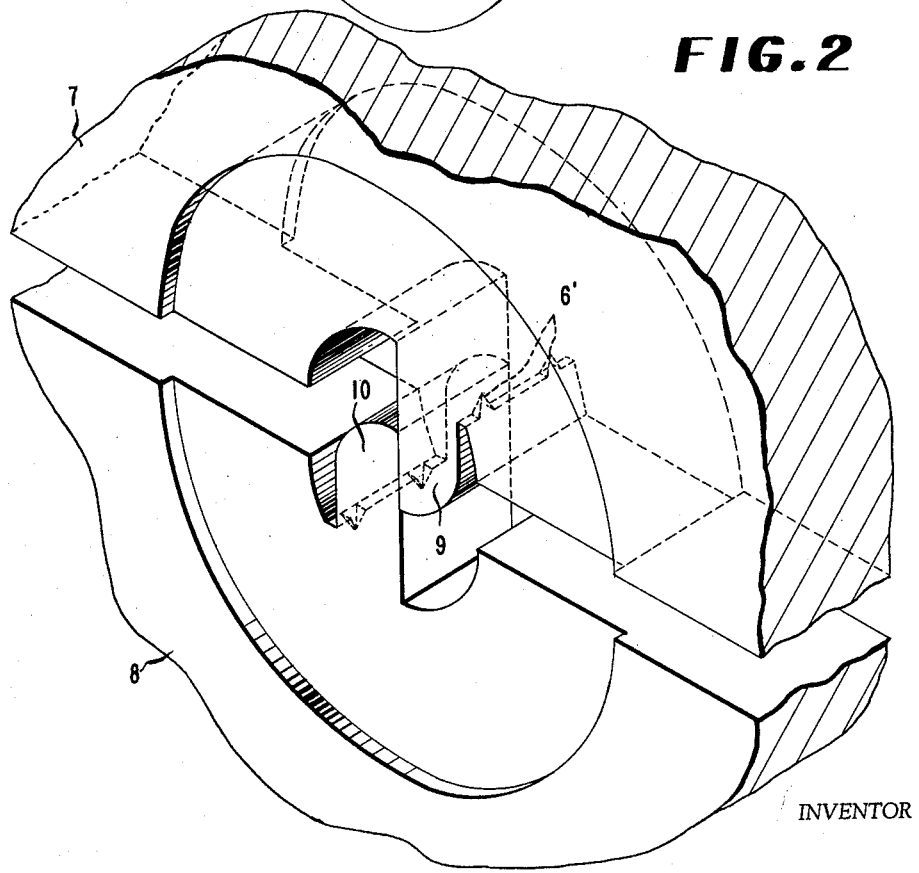

The spool will now be more fully described with reference to the accompanying drawing which forms a part of this application. With reference to the drawing FIG. 1 is a cutaway perspective view of the spool;
FIG. 2 is a fragmentary view showing the mold sections in separated relationship.

The novel one-piece spool of this invention, as illustrated in the drawing, comprises a hollow, cylindrical hub 1 and integrally connected to opposite ends of the hub flange members 2 and 3. The flange members are of the configuration and type used in prior art motion picture spools. They have an axial mounting aperture for reception of a coacting member, e.g., the camera spindle, shaft, arbor or key projection. The aperture generally has splines extending radially inwardly toward the axial center of the flange. One flange member may have an aperture having three splines and the opposite flange member an aperture having four splines although other aperture configurations are possible, e.g., holes, slots, etc., for engaging various driving and orienting means for film reels. Suitable such apertures for engaging a coacting part of a camera, recording apparatus, projector, etc., are described in U.S. Patents 1,941,522; 2,180,829; 2,380,788 and 2,643,072.

The hub 1 preferably has two essentially parallel longitudinal slots 4 and 5 which extend the entire length of the hub and terminate at the inner side of the flange members. The slots also extend through the hub into the center hollow area 11. Slots 4 and 5 have essentially the same width of opening, the opening being substantially greater than the thickness of a film to be engaged.

The hub is provided with at least one tooth 6 for engaging a perforation of a motion picture film, the tooth extending into a slot. The tooth is preferably pointed but can be flat, rounded, etc. on the edge which is inserted in a perforation. In the embodiment shown in FIG. 1, a pair of teeth extend into each of the slots and are positioned on opposite sides of the hub in opposed relationship (i.e., one pair at the top and one pair at the bottom). It is understood, as explained above, that variations can be made in the hub, e.g., the hub can be provided with one, two or more parallel slots and have one tooth, a pair of teeth, etc. extending from the hub into at least one slot.

The roll of film is placed on the spool by placing a film perforation, at or near the end of the film, over its respective hub tooth and rotating the spool. The spool quickly and easily engages the film and holds it fast. By this means the film is held fast as the remaining film is then wound on the spool.

The novel one-piece spool, described above, is made by molding, e.g., by injection molding as described in Delmonte's "Plastics Molding," John Wiley & Sons, Inc., New York, pp. 296–387 (1952). The mold for making the spool which is shown in separated relationship in FIG. 2 comprises upper and lower sections 7 and 8, respectively. The slots are formed by the combination of extension 9 of upper section 7 and extension 10 of lower section 8. The teeth are shown at 6'. The upper and lower mold sections can easily slide in and out of each other and still form the curved sections of the hub. The comparatively wide slots decrease the weight of the spool and eliminate plastic material. Inserts (not shown) are centrally placed on the axis of the mold to form the three- and four-splined or other type aperture for reception of the coacting member, e.g., spindle, shaft, arbor, key projection, etc.

When the mold is assembled in an injection molding machine, a suitable molding material is injected into the mold, the material is cooled and the upper and lower sections are opened first to allow removal of the spool. It is readily understood that the dimensions of any part of the spool can be varied merely by changing the dimensions of the mold sections. Directions for engaging the film on the spool, indexing and other identifying characters can be incorporated in the mold.

Suitable molding materials include synthetic resins, superpolymers and cellulose derivatives, e.g., cellulose acetate, cellulose propionate, cellulose acetate butyrate, cellulose acetate propionate, methyl cellulose, ethyl cellulose, benzyl cellulose; polystyrene, alkyd resins, cresol-formaldehyde resins, vinyl resins, e.g., polyvinyl chloride, polyvinyl fluoride, polyvinylidene chloride; polyolefins, e.g., polyethylene, polypropylene, and copolymers thereof; polymethyl methacrylates, polyfluorocarbons, e.g., polychlorotrifluoroethylene, polytetrafluoroethylene; polyoxymethylene, nylons, etc.

The plastic compositions can, of course, be modified by the incorporation of various plasticizers, e.g., camphor, aryl phosphates, alkyl phthalates, glycerol, castor oil, etc.; pigments, e.g., lithopone, graphite, carbon black, titanium oxide, phthalocyanine dyes, etc.; filters, e.g., wood flour, diatomaceous earth, etc.

The spools should be photographically inert so that the film elements spooled thereon will not be deleteriously affected.

While the spools of this invention were expressely designed for use in motion picture cameras, they may find utility for other sheet materials, e.g., paper, cloth, unsensitized films, thread, rope, wire, etc.

An advantage of this invention is that the one-piece spools are simple in construction and economical to produce. Another advantage is that the spools are extremely light in weight and yet are sturdy and reliable in use. Still another advantage is that hand assembly of the spools has been eliminated and the spools are therefore of uniform construction. Still other advantages will be apparent from the foregoing description.

What is claimed is:

1. A molded one-piece camera spool for holding motion picture film comprising spaced end flange members each having an axial mounting aperture adapted to receive a coacting member and a hollow cylindrical hub extending therebetween and integrally connected therewith, said hub having two essentially parallel, substantially opposed slots extending longitudinally the length of the hub and terminating at said flange members and being provided with at least one tooth extending into a slot for engaging a perforation of a motion picture film, said hub having a pair of peripheral portions interconnecting said slots, said peripheral portions being characterized in that any interior portion thereof is accessible through an adjacent slot along a line parallel to a diameter of said hub and each peripheral portion has a pair of edges, each forming a surface of a slot wherein one edge of each said peripheral portion is parallel and diametrically opposite the other edge of the other peripheral portion and a part of the interior of each peripheral portion adjacent the remaining edges is a planar surface parallel to the said first edges, thereby permitting said spool to be molded in one piece by co-acting mold sections movable radially to the hub of said spool.

2. A spool as defined in claim 1 wherein the slots are essentially the same size.

3. A spool as defined in claim 1 wherein a pair of laterally spaced teeth extend into at least one of said slots.

4. A spool as defined in claim 3 wherein a pair of laterally spaced teeth extend into each of said slots and are positioned in opposed relationship.

5. A molded one-piece camera spool for holding motion picture film comprising spaced end flange members each having an axial mounting aperture adapted to receive a co-acting member and a hollow, cylindrical hub extending therebetween and integrally connected therewith, said hub having two essentially parallel, substantially opposed slots extending longitudinally the length of the hub and terminating at said flange members and being provided with at least one tooth extending into a slot for engaging a perforation of a motion picture film, said hub having a pair of peripheral portions interconnecting said slots, said peripheral portions being characterized in that any interior portion thereof is accessible through an adjacent slot along a line parallel to a diameter of said hub and in that the interior of each peripheral portion has a planar surface along one edge thereof, said edges being parallel to and diametrically opposite one another, said hub being formed through coaction of a pair of mold sections wherein substantially the complete interior surface of one peripheral portion and a substantial part of the exterior of the other peripheral portion is formed by one mold section and the remaining surfaces are formed with the other mold section, thereby permitting said spool to be molded in one piece, by co-acting mold sections movable radially of the hub of said spool.

References Cited in the file of this patent

UNITED STATES PATENTS

| | | |
|---|---|---|
| 849,076 | Mathein | Apr. 2, 1907 |
| 1,509,441 | Niess-Waner | Sept. 23, 1924 |
| 2,055,626 | Howell | Sept. 29, 1936 |
| 3,092,349 | Corsan | June 4, 1963 |
| 3,124,320 | Brennesholtz et al. | Mar. 10, 1964 |

FOREIGN PATENTS

| | | |
|---|---|---|
| 59,365 | France | Jan. 6, 1954 |
| | (1st addition to No. 986,433) | |
| 1,102,943 | France | May 18, 1955 |
| 1,207,281 | France | Aug. 31, 1959 |
| (Corresponding Australia—224,588, Oct. 14, 1959) | | |